US012352406B2

(12) United States Patent
Quinto et al.

(10) Patent No.: US 12,352,406 B2
(45) Date of Patent: Jul. 8, 2025

(54) ACCENT SHELF LIGHT FOR WALL OR CEILING

(71) Applicants: Theo Quinto, Bradenton, FL (US); Richard S. Ohlsson, Sarasota, FL (US)

(72) Inventors: Theo Quinto, Bradenton, FL (US); Richard S. Ohlsson, Sarasota, FL (US)

( * ) Notice: Subject to any disclaimer, the term of this patent is extended or adjusted under 35 U.S.C. 154(b) by 0 days.

(21) Appl. No.: 18/536,833

(22) Filed: Dec. 12, 2023

(65) Prior Publication Data

US 2024/0191848 A1 Jun. 13, 2024

Related U.S. Application Data

(60) Provisional application No. 63/387,015, filed on Dec. 12, 2022.

(51) Int. Cl.

*F21S 8/00* (2006.01)
*F21S 4/20* (2016.01)
*F21Y 103/10* (2016.01)
*F21Y 115/10* (2016.01)

(52) U.S. Cl.

CPC ................. *F21S 8/033* (2013.01); *F21S 4/20* (2016.01); *F21Y 2103/10* (2016.08); *F21Y 2115/10* (2016.08)

(58) Field of Classification Search

CPC ...... F21S 8/036; F21S 4/20; F21S 4/28; F21S 4/22; F21S 4/24; F21S 4/26; F21Y 2103/10; F21Y 2115/10; F21V 21/02; F21V 21/025

See application file for complete search history.

(56) References Cited

U.S. PATENT DOCUMENTS

| | | | | | |
|---|---|---|---|---|---|
| 1,569,493 | A * | 1/1926 | Hotchkin | F21S 8/04 | D26/118 |
| 1,780,125 | A * | 10/1930 | Goodhouse | F21V 7/0008 | 362/147 |
| 7,114,826 | B1 * | 10/2006 | Lilly | F21S 4/20 | 362/147 |
| 10,203,077 | B1 * | 2/2019 | Bremser | F21V 17/107 | |
| 10,927,591 | B1 * | 2/2021 | Brychell | F21V 33/006 | |
| 2005/0225982 | A1 * | 10/2005 | Hahn | F21V 7/0016 | 362/249.16 |
| 2005/0243547 | A1 * | 11/2005 | Cini | F21S 8/037 | 362/225 |
| 2016/0186943 | A1 * | 6/2016 | Howard | F21V 7/0008 | 362/147 |
| 2017/0023156 | A1 * | 1/2017 | Hoffman | H02G 3/04 | |
| 2021/0325011 | A1 * | 10/2021 | Chokshi | F21V 17/164 | |

* cited by examiner

*Primary Examiner* — Erin Kryukova

(74) *Attorney, Agent, or Firm* — McHale & Slavin, P.A.

(57) ABSTRACT

A wall light shelf which is attachable to existing wall structures or is built as a standalone wall within a room or structure which requires light.

15 Claims, 11 Drawing Sheets

ACCENT SHELF LIGHT FOR WALL OR CEILING

FIELD OF THE INVENTION

In accordance with 37 C.F.R. 1.76, a claim of priority is included in an Application Data Sheet filed concurrently herewith. Accordingly, the present invention claims priority to herewith. Application No. 63/387,015 entitled, "WALL U.S. Provisional LIGHTING UNIT", filed Dec. 12, 2022. The contents of the above referenced application are incorporated herein by reference in their entirety.

FIELD OF THE INVENTION

The present invention relates to lighting units; more particularly, to a wall light shelf which is attachable to existing wall structures or is built as a standalone wall within a room or structure which requires light.

BACKGROUND OF THE INVENTION

Illumination is an essential part of most buildings inhabited or used by humans. Such illumination is typically used to maintain sufficient visual capabilities, whether during the day or night, for safe movement within the building without fear of tripping or running into other structures placed within the buildings. In addition, use of illumination within the building, whether inside or outside, prevents unwanted or uninvited individuals from entering the building and causing harm. While there are many mechanisms to provide illumination, such as the use of lamps or overhead track lighting, unique mechanisms to illuminate an area and create unique ambiance effects is needed.

SUMMARY OF THE INVENTION

The present invention relates to a wall light shelf which is attachable to existing wall structures or is built as a standalone wall within a room or structure which requires light. The wall light shelf (may also be referred to as an accent shelf light for wall or ceiling) may, for example, attach to the upper part of a wall ending, for example, 2 inches below the ceiling in order to create a protruding shelf that houses a light source, creating an ambience effect in the room by reflecting off the 2-inch×2-inch area above the wall light shelf and the ceiling. The top portion of the wall light shelf creates the shelf part that extends out from the wall, such as 2 inches out from the wall. The wall light shelf may start 10 inches below the ceiling and blend seamlessly into the wall.

In an illustrative embodiment, the wall light shelf may comprise an illumination device receiving member sized and shaped to receive or hold a source of illumination, the illumination receiving member comprising a first end, a second, opposing end, and a body separating the first end and the second end; and an illumination device landing comprising a generally flat wall or surface sized and shaped to receive or hold an illumination device. The wall light shelf optionally may comprise a light source, such as a light emitting diode (LED).

Accordingly, it is an objective of the invention to provide unique wall lighting.

It is a further objective of the invention to provide a unique wall light shelf which is attachable to existing wall structures which require light.

It is yet another objective of the invention to provide a unique wall light shelf which is built as a standalone wall within a room or structure which requires light.

Other objectives and advantages of this invention will become apparent from following the description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
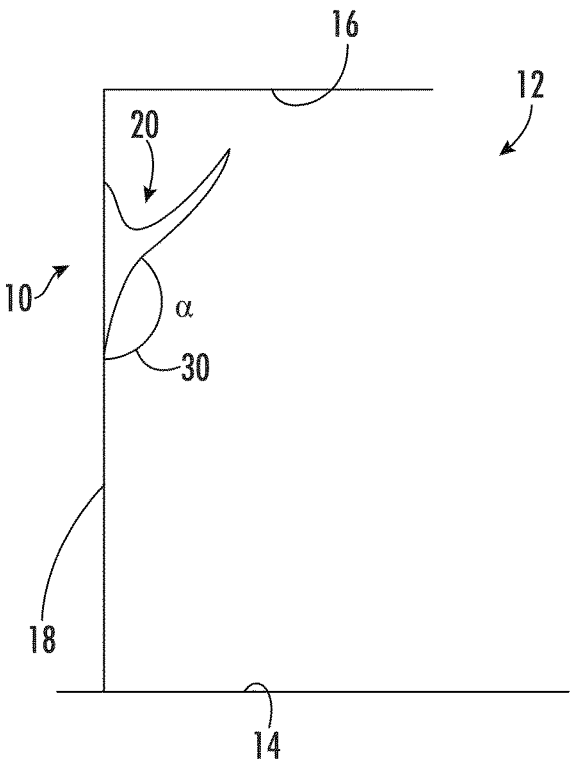
FIG. 1 is a side view illustrating an embodiment of the wall light shelf within a room.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIG. 1, an illustrative example of a lighted wall or lighted wall unit, referred to generally as wall light shelf 10 (alternatively, as accent shelf light for wall or ceiling 10), is shown. The wall light shelf 10 may be built directly as a wall, or may be designed as an attachable or securable (via mechanical mechanisms, such as nails or screws, or chemical mechanisms, such as glue) wall unit to add to existing wall structures, including ceilings. The wall light shelf 10 may be attached or adhered to a wall or ceiling either in a vertical orientation or in a horizontal orientation. The wall light shelf 10 is designed to provide a unique wall structure shape, as well as a mechanism to provide light to an area, such as a room. The wall light shelf 10 may be made of any material known to one of skill in the art. Illustrative examples of the wall light shelf material may include DENSGLASS (gypsum-based fiberglass mat sheathing), corner bead (metal material), or similar materials.

As seen in FIG. 1, the wall light shelf 10 is shown in a room 12 defined by a floor 14 and a ceiling 16. The wall light shelf 10 is part of the wall 18, separating the floor 14 and ceiling 16. The wall light shelf 10 has an illumination receiving member or portion 20 sized and shaped to receive or hold an illumination source, such as an LED light. The wall light shelf 10 illustrated in FIG. 1 is shown constructed as part of the wall 18.

Figure 2A:
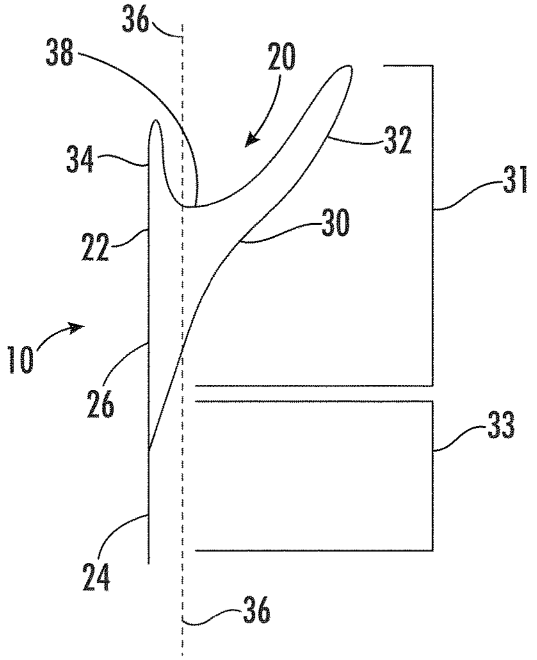
FIG. 2A is an embodiment of the wall light shelf not attached or formed as part of a wall.
Figure 2B:
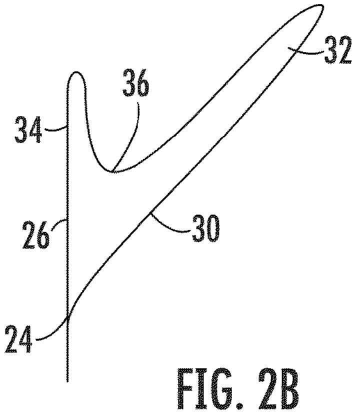
FIG. 2B is an alternative embodiment of the wall light shelf not attached or formed as part of a wall.

The illumination receiving member or portion 20 comprises a first, or upper end 22, a second, or lower end 24, and a main body 26 therebetween, see FIG. 2A. The illumination receiving portion main body 26 preferably comprises a curved surface 30, forming an angle, $\alpha$. The curved surface 30 provides for an upper section or portion 31 of the body 26 to be wider than a lower section or portion 33. The curved surface 30 could be formed as an angled surface, less than 90 degrees, (see FIG. 2B), such as between 89 and 80 degrees, between 79 and 70 degrees, between 69 and 60 degrees, between 59 and 50 degrees, between 49 and 40 degrees, such as 45 degrees, between 39 and 30 degrees, between 29 and 20 degrees, between 19 and 10 degrees, or between 9 and greater than zero degrees. Alternatively, the curved surface 30 could be formed as an angled surface of 90 degrees. The illumination receiving portion first or upper end 22 may be defined by a first protruding body 32 orientated to extend outwardly or away from the main body 26, and a second protruding body 34 extending upwardly from the main body 26 and in a generally parallel orientation relative to a longitudinal axis 36. Preferably, the illumination receiving portion first protruding body 32 is orientated at an angle from the longitudinal axis 36. In addition, it is preferable (but not required) that the illumination receiving portion first protruding body 32 has a height that is larger than the height of the illumination receiving portion second protruding body 34. In this configuration, the illumination receiving portion first protruding body 32 rests closer to the ceiling (when part of a wall) than the illumination receiving portion second protruding body 34, thus creating a lip in the overall wall structure.

Figure 5:
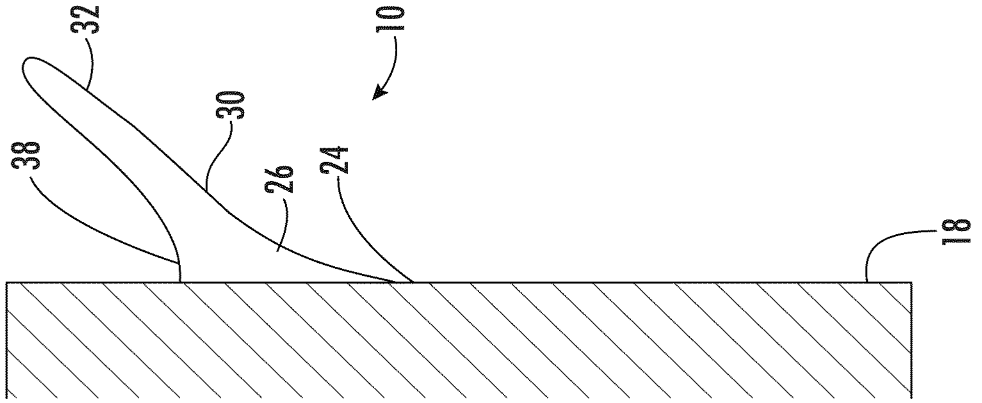
FIG. 5 illustrates the wall light shelf shown in FIG. 3 secured to, or formed as part of a wall.
Figure 4:
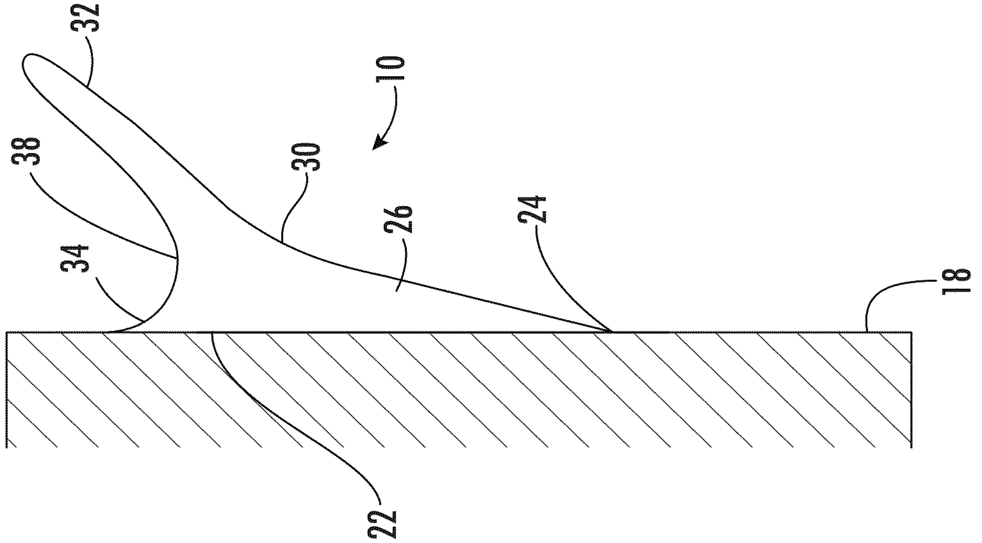
FIG. 4 illustrates the wall light shelf shown in FIG. 2A secured to, or formed as part of a wall.
Figure 3:
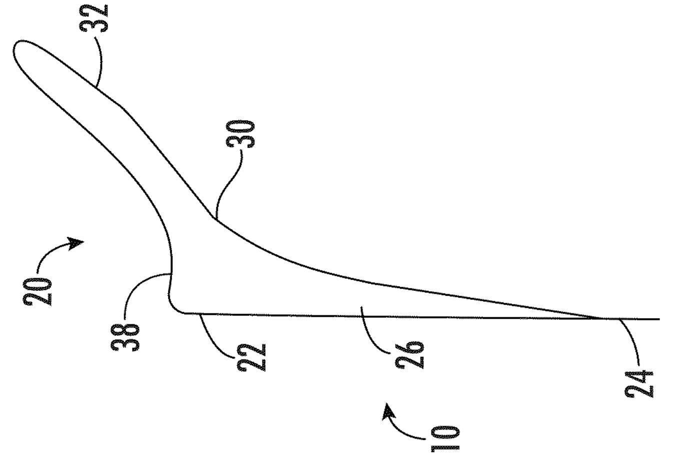
FIG. 3 illustrates the wall light shelf without a second protruding body.

Separating the illumination receiving portion first protruding body 32 and the illumination receiving portion second protruding body 34 is an illumination device landing 38. The illumination device landing 38 may be formed by a generally flat wall or surface designed to receive or hold an illumination device, such as an LED light (not shown). While shown with an illumination receiving portion first protruding body 32 and an illumination receiving portion second protruding body 34, the wall light shelf 10 may be designed without the illumination receiving portion second body protruding 34. FIG. 3 illustrates the illumination receiving member or portion 20 having the illumination receiving portion first protruding body 32, but not the illumination receiving portion second protruding body 34. FIG. 4 illustrates the wall light shelf 10 shown in FIG. 2A attached to or constructed as part of the wall 18. FIG. 5 illustrates the wall light shelf 10 shown in FIG. 3 attached to or constructed as part of the wall 18.

Figure 6:
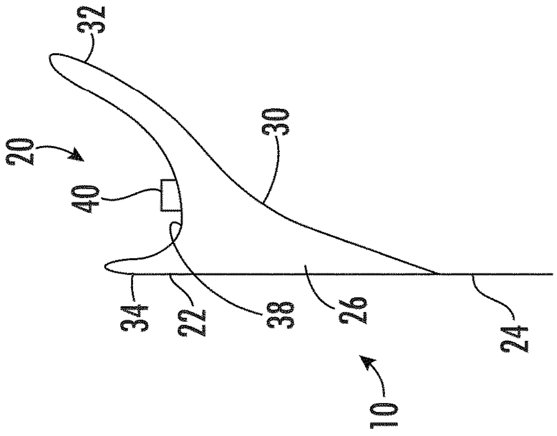
FIG. 6 illustrates the wall light shelf with an LED strip.
Figure 7:
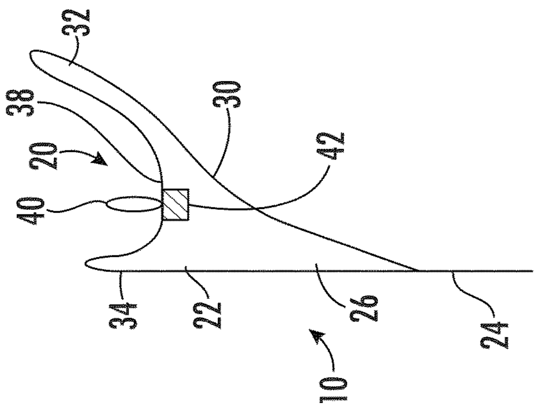
FIG. 7 illustrates the wall light shelf with an LED bulb.

The wall light shelf 10, whether attached to a wall or formed as part of the wall, is designed to provide illumination. Preferably, the illumination receiving member or portion 20 is configured to either receive and hold a self-generating illumination device (such as an LED light) or provide a power source to generate light. Referring to FIG. 6, the wall light shelf 10 is shown with an LED light strip 40 (or LED light rope) placed within the illumination receiving member or portion 20 and resting on the illumination device landing 38. The LED light strip 40 may include a single light color, such as white light, or multiple colors, such as red, blue, green, orange, or combinations thereof. The illumination device landing 38 may be configured to provide an electrical source for illumining an LED or other light source. FIG. 7 illustrates an embodiment of the wall light shelf 10 having a light socket 42 (such as a bulb screw in type or a tube lighting type), or an electrical outlet which receives a plug, configured to mechanically support and provide electrical connections for an individual bulb or LED bulb 41 (or tube). As shown in the figure, the LED bulb 41 is screwed in place or electrically connected to the light socket 42. Other mechanisms for providing electricity, such as through the use of wire leads for direct connection to screw terminals, known to one of skill in the art, may be used.

Figure 8:
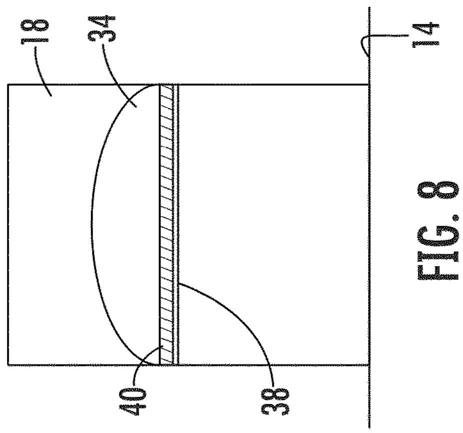
FIG. 8 is a front view of the wall light shelf illustrating the LED strip extending the entire length of an illumination device landing, shown with the illumination receiving portion first protruding body removed.
Figure 9:
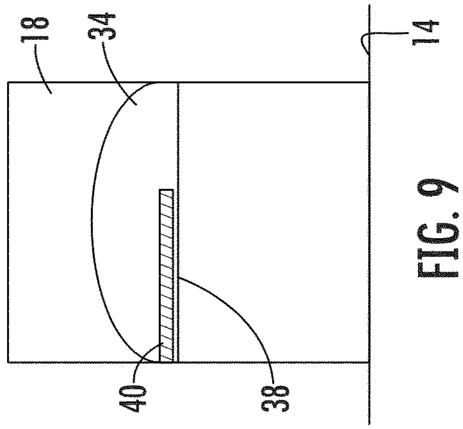
FIG. 9 is a front view of the wall light shelf illustrating the LED strip extending less than the entire length of an illumination device landing, shown with the illumination receiving portion first protruding body removed.
Figure 10:
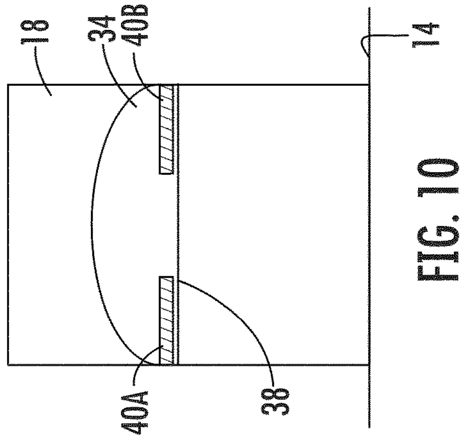
FIG. 10 is a front view of the wall light shelf illustrating multiple LED strips extending less than the entire length of the illumination device landing, shown with the illumination receiving portion first protruding body removed.

The wall light shelf 10 may include a light source that runs the entire length of the illumination device landing 38. Alternatively, the light source may run less than the full length, such as ¾ the length, ½ the length, or ¼ the length. FIGS. 8-10 illustrate the wall light shelf 10 secured to or as part of the original wall construction, with various lengths or numbers of LED strips 40. Each of the figures are shown with the illumination receiving portion first protruding body 32 removed to illustrate the light source on the illumination landing 38. Referring specifically to FIG. 8, the LED strip 40 is shown extending the entire length of the illumination device landing 38. FIG. 9 illustrates the LED strip 40 extending less than the entire length of the illumination device landing 38. FIG. 10 illustrates the LED strip 40 extending less than the entire length of the illumination device landing 38. In this embodiment, multiple LED strips 40A, 40B are used. The multiple LED strips 40A, 40B may be the same light color (wavelength), i.e. white light, or different light colors, such as white, red, blue, green, yellow, orange, purple.

Figure 11:
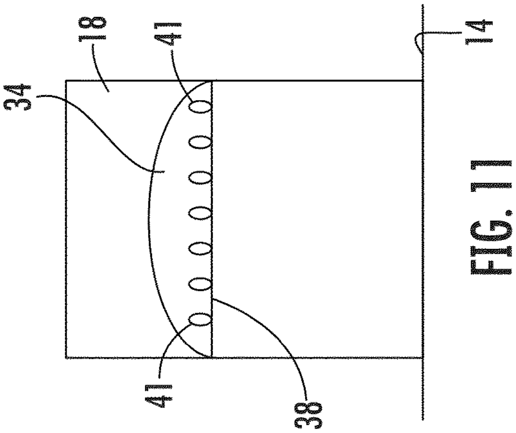
FIG. 11 is a front view of the wall light shelf illustrating the illumination device landing having multiple LED bulbs extending the entire length.
Figure 12:
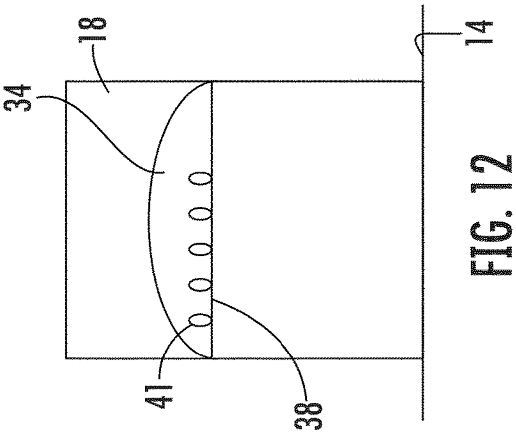
FIG. 12 is a front view of the wall light shelf illustrating the illumination device landing having multiple LED bulbs extending less than the entire length.
Figure 13:
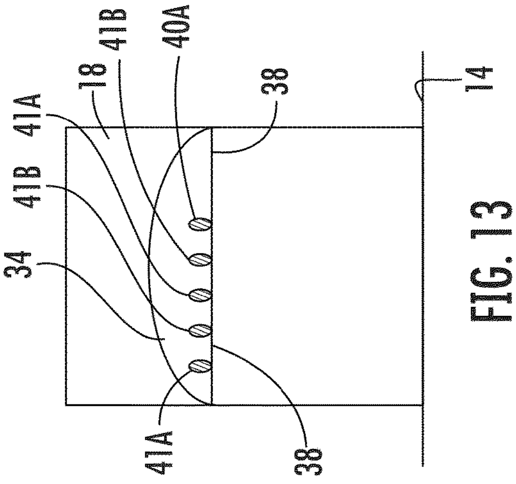
FIG. 13 is a front view of the wall light shelf illustrating the illumination device landing having multiple colored LED bulbs extending less than the entire length.

FIGS. 11-13 illustrate the wall light shelf 10 secured to or as part of the original wall construction, with various individual LED light bulbs 41. Each of the figures are shown with the illumination receiving portion first protruding body 32 removed to illustrate the light source on the illumination device landing 38. Referring specifically to FIG. 11, the illumination device landing 38 is shown having multiple LED bulbs 41 extending the entire length of the illumination device landing 38. FIG. 12 illustrates the LED bulbs 41 extending less than the entire length of the illumination device landing 38. FIG. 13 illustrates the LED bulbs 41 extending less than the entire length of the illumination device landing 38. In this embodiment, multiple LED bulbs 41A, 41B are used. The multiple LED bulbs 41A, 41B may be the same light color (wavelength), i.e. white light, or different light colors, such as white, red, blue, green, yellow, orange, purple. While the illumination device landing 38 is shown having single row of LED bulbs 41 in each of the figures, additional rows, such as 2, 3 or more, may be used.

Figure 14:
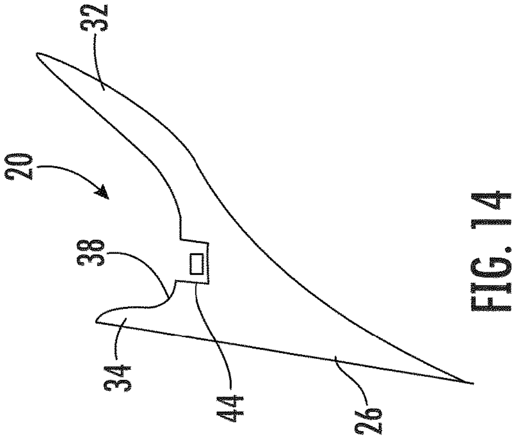
FIG. 14 illustrates an embodiment of an illumination securing member as a channel formed within the illumination device landing.
Figure 15:
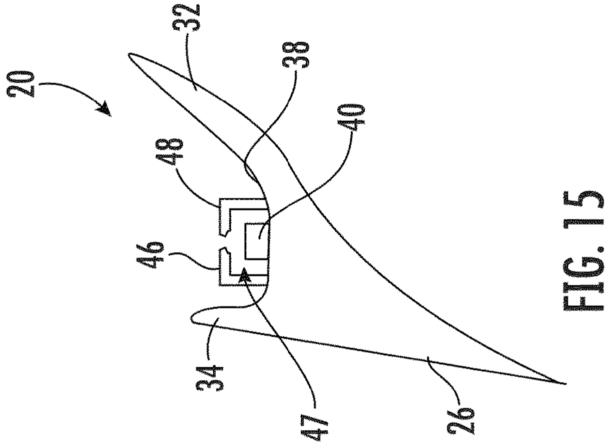
FIG. 15 illustrates an embodiment of the illumination securing member as clasps.

In embodiments of the wall light shelf 10 using a removable light source, such as the LED strip 40, and not a light source screwed into the socket 42, the illumination receiving member or portion 20 may include an illumination securing member configured for maintaining a light source within the illumination receiving member or portion 20. FIG. 14 illustrates an embodiment of the illumination securing member as a channel 44 formed within the illumination device landing 38. The illumination securing member channel 44 is sized and shaped to receive and store the LED strip 40 within, preventing or restricting LED strip movement. FIG. 15 illustrates an embodiment of the illumination securing member as a clasp 46 and 48 secured or formed to the illumination device landing 38. The illumination securing member clasps 46 and 48 (both illustrated as individual, reverse oriented, "L-shaped" bodies separated by a space creating an interior area 47) are sized, shaped, and movable to receive and store the LED strip 40 therein, preventing or restricting LED strip movement.

Figure 16:
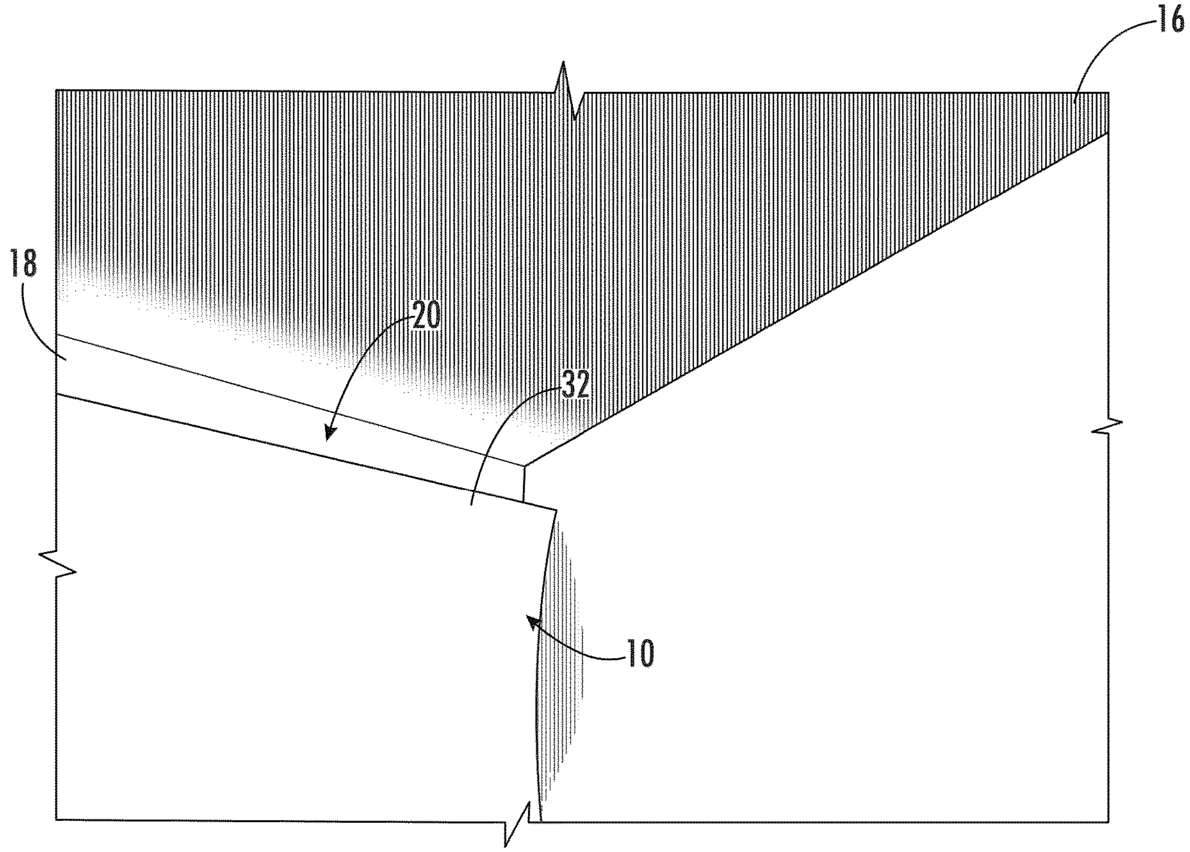
FIG. 16 is a front view of the wall light shelf secured to or formed as part of a wall within a room.
Figure 17:
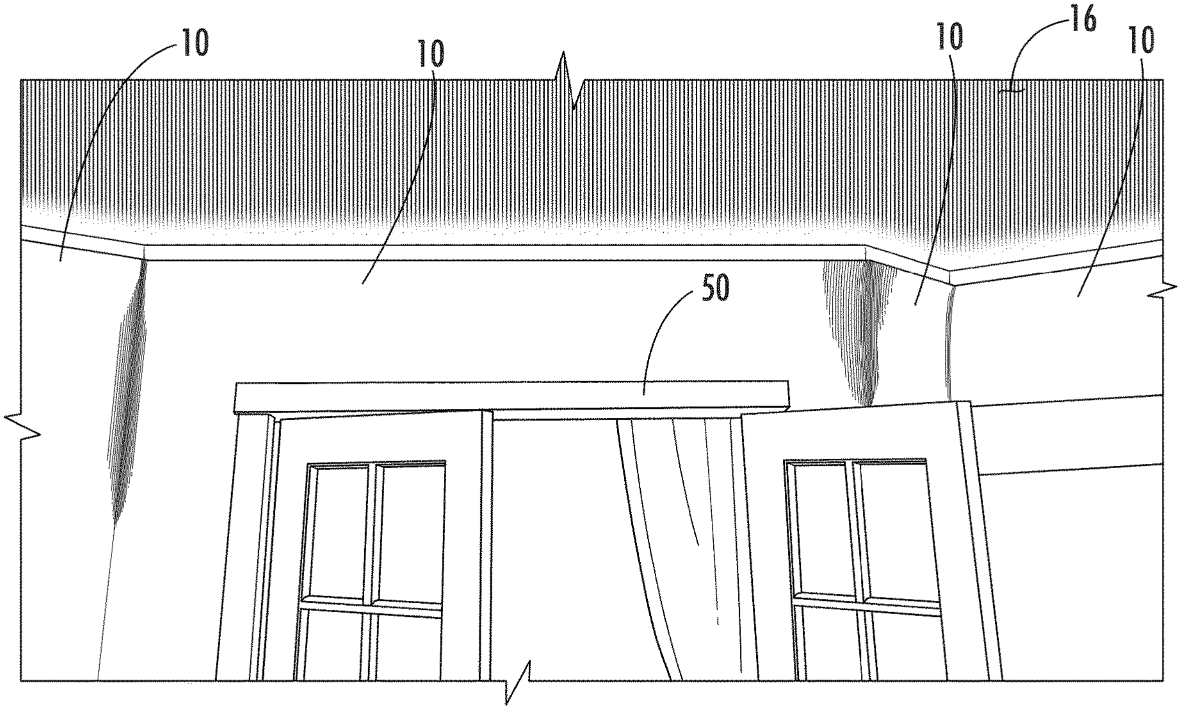
FIG. 17 illustrates the wall light shelf with multiple sections, creating a light effect for the entire room.
Figure 18:
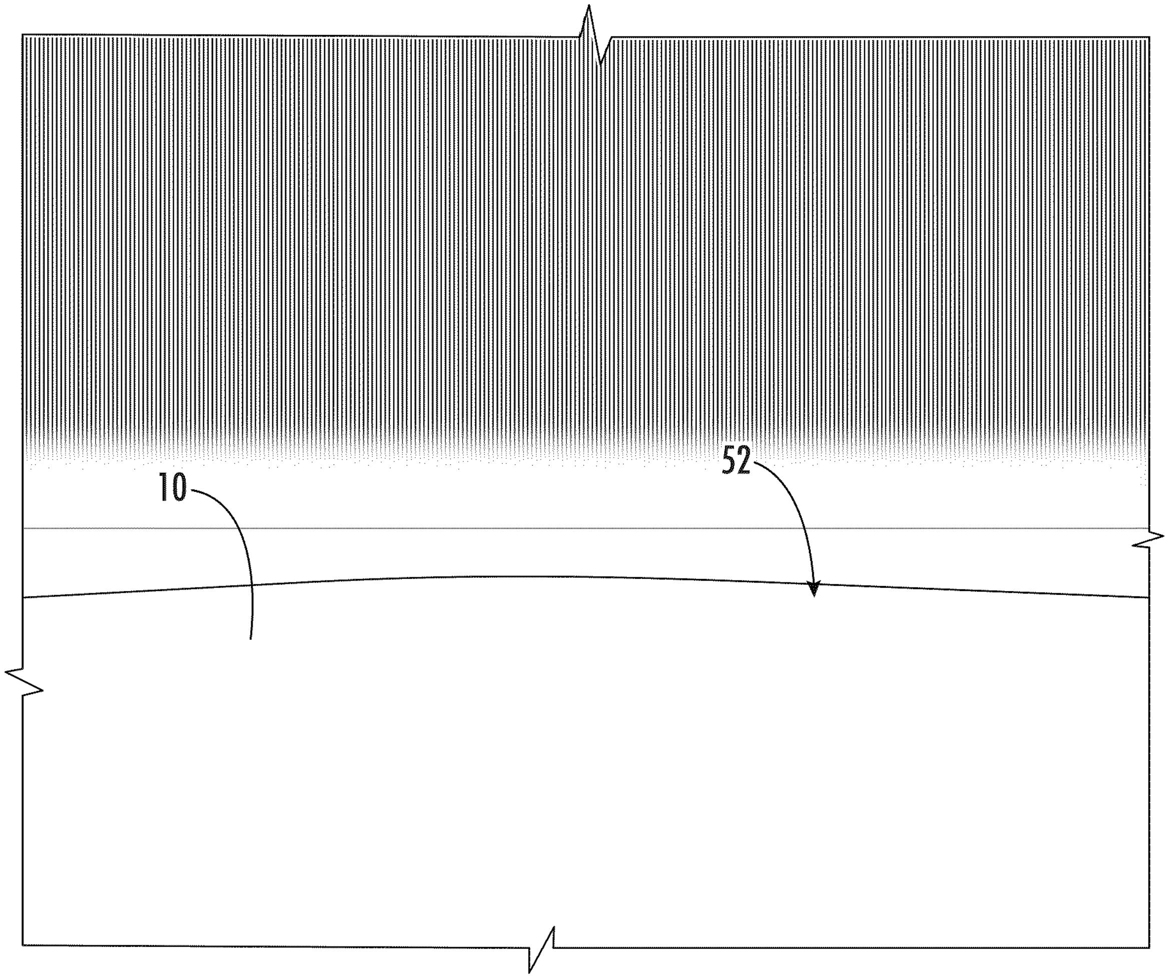
FIG. 18 illustrates the wall light shelf in a straight design.
Figure 19:
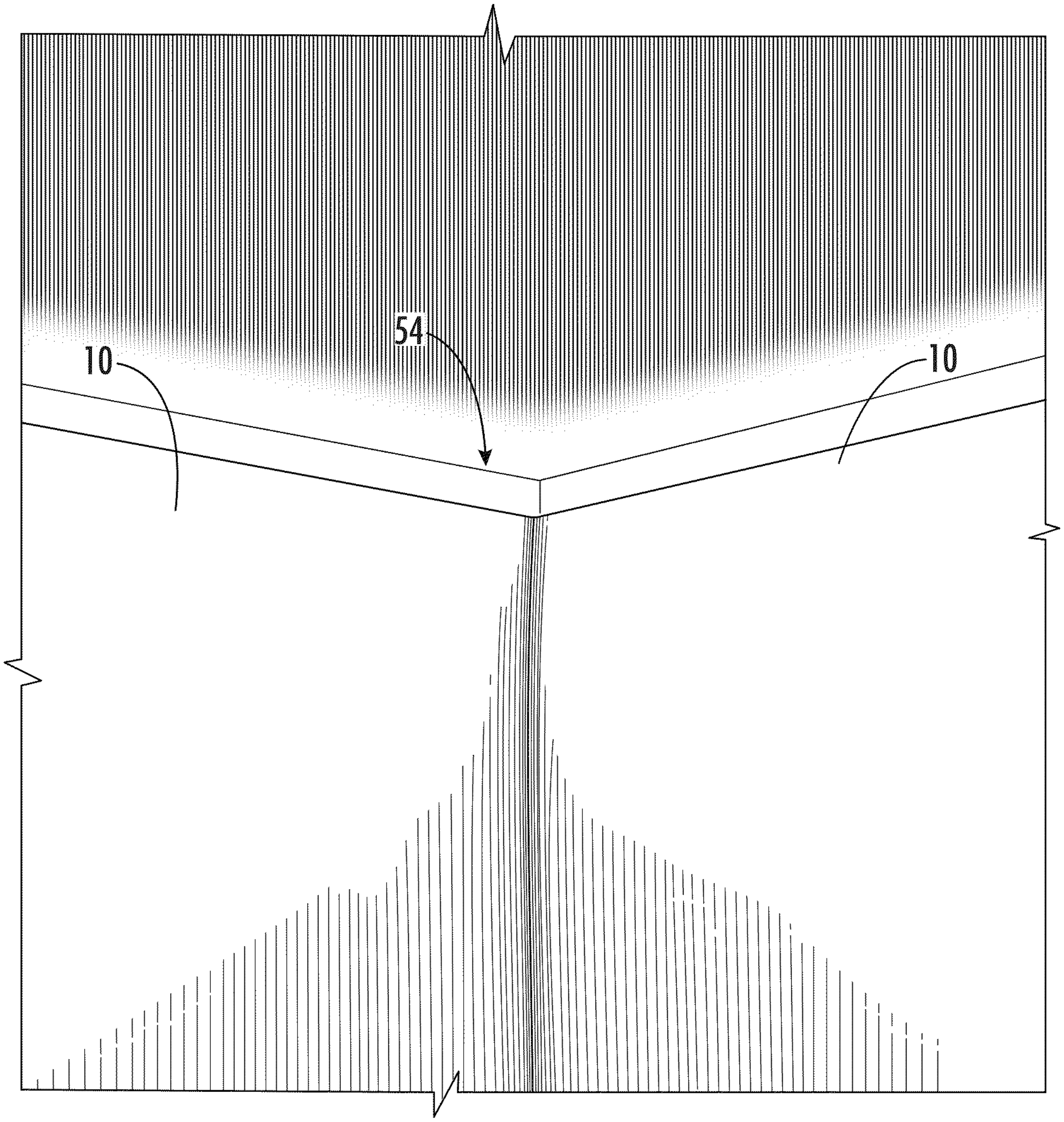
FIG. 19 illustrates the wall light shelf in a 45 degree inside angle design.
Figure 20:
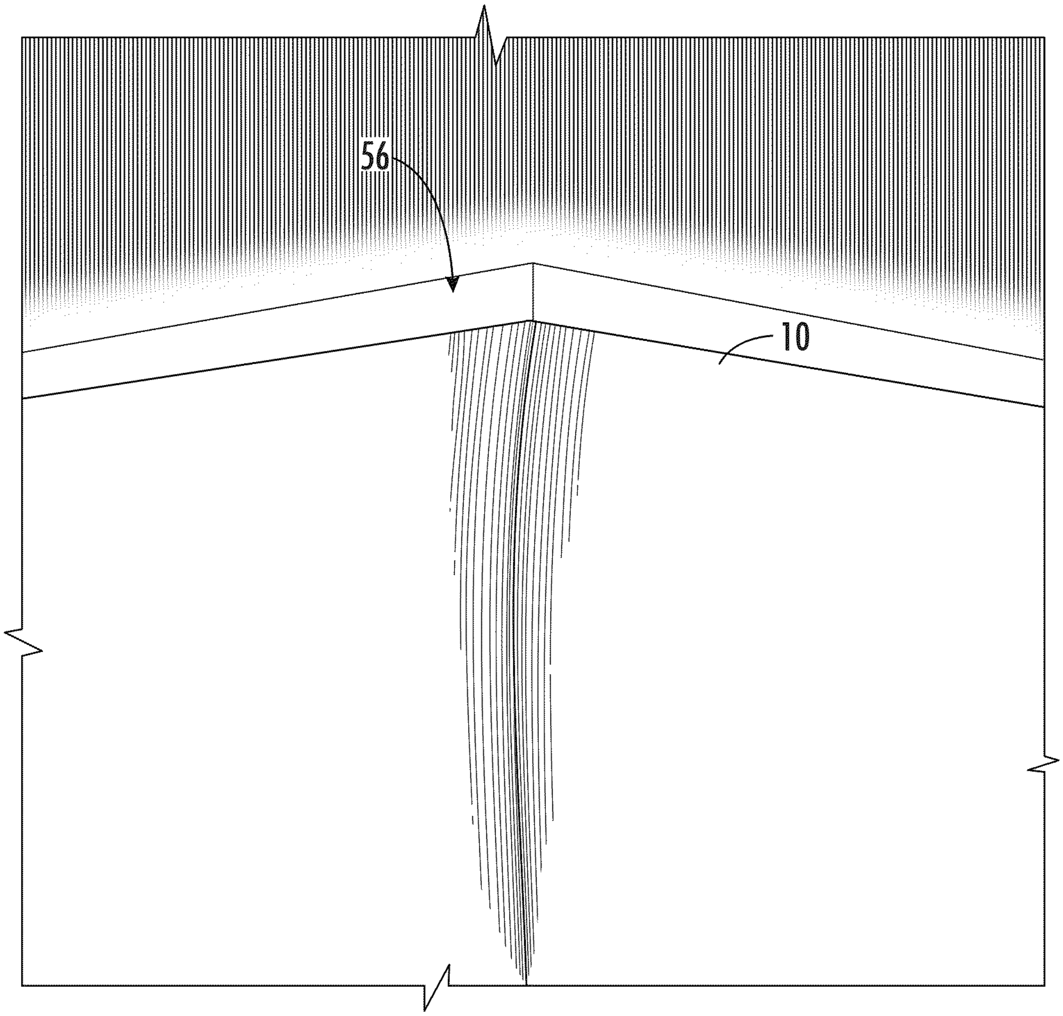
FIG. 20 illustrates the wall light shelf in a 45 degree outside angle design.
Figure 21:
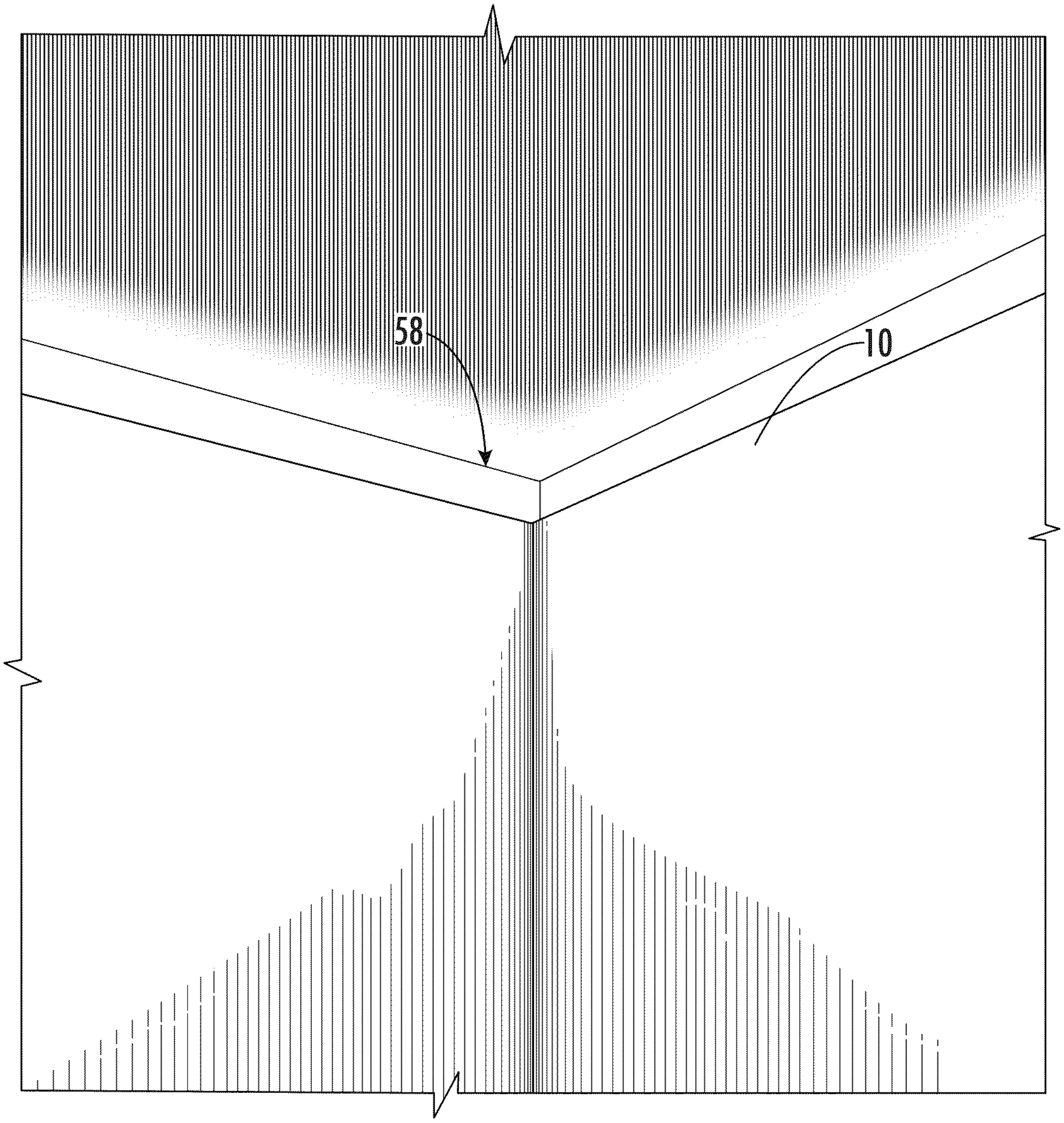
FIG. 21 illustrates the wall light shelf in a 90 degree inside corner design.
Figure 22:
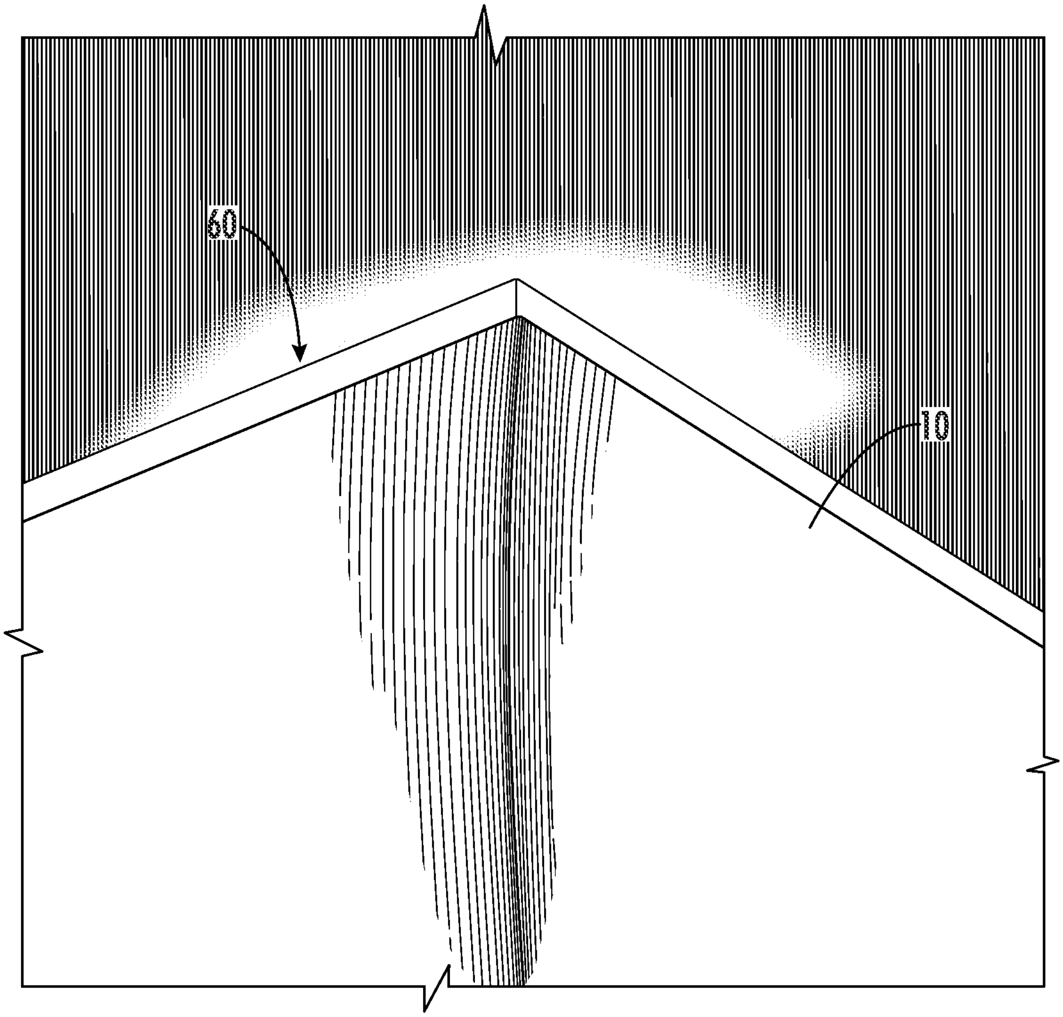
FIG. 22 illustrates the wall light shelf in a 90 degree outside corner design.

FIG. 16 is a front view of the wall light shelf 10 secured to or formed as part of the wall 18. The first protruding body 32 is shown having a curvature, and having a height that rests below the ceiling 16 to allow light shining from within the illumination receiving member or portion 20 to be dispersed within the room towards the ceiling 16. FIG. 17 illustrates the wall light shelf 10 with multiple sections, creating a light effect for the entire room. Doors 50 are shown for frame of reference. The wall light shelf 10 may be designed to form various sections, such as straight 52, see FIG. 18, 45 degree inside angle 54, see FIG. 19, 45 degree outside angle 56, see FIG. 20, 90 degree inside corner 58, see FIG. 21, or 90 degree outside corner 60, see FIG. 22.

All patents and publications mentioned in this specification are indicative of the levels of those skilled in the art to which the invention pertains.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A wall light shelf comprising:

an illumination device receiving member mounted to a wall surface using a material such that said illumination device receiving member appears as part of the wall surface itself, said illumination device receiving member sized and shaped to receive or hold a source of illumination, said illumination device receiving member comprises a first end, a second, opposing end, a first protruding body, and a landing; said first protruding body integrally formed from said illumination device receiving member, said first protruding body extending upwardly and terminating at a height below a ceiling, forming a space from said ceiling and thereby creating an ambience effect in said room by reflecting light off an area above said wall light shelf to said ceiling, said first protruding body also extending outwardly at an angle from said wall, forming a bend which appears seamless with said surface wall, said landing comprising a wall or surface sized and shaped to receive or hold said source of illumination.

2. The wall light shelf according to claim 1, wherein said illumination device receiving member comprises a curved surface.

3. The wall light shelf according to claim 1, wherein said angle is 90 degrees.

4. The wall light shelf according to claim 1, wherein said angle is less than 90 degrees.

5. The wall light shelf according to claim 1, wherein said angle is 45 degrees.

6. The wall light shelf according to claim 1, wherein said illumination device receiving member comprises a second protruding body positioned at a distance from said first protruding body, said second protruding body integrally formed from said illumination device receiving member and extending upwardly in a direction toward said ceiling.

7. The wall light shelf according to claim 6, wherein said first protruding body has a tip which is arranged at a higher position than a tip of said second protruding body.

8. The wall light shelf according to claim 1, wherein said illumination device receiving member comprises a light source.

9. The wall light shelf according to claim 8, wherein said light source is an LED light.

10. The wall light shelf according to claim 8 wherein said light source is arranged along an entire length of said landing.

11. The wall light shelf according to claim 8 wherein said light source is arranged along less than an entire length of said landing.

12. The wall light shelf according to claim 1, wherein said illumination device receiving member comprises multiple light sources.

13. The wall light shelf according to claim 1, wherein said illumination device receiving member comprises at least one row of lights.

14. The wall light shelf according to claim 1, wherein said illumination device receiving member comprises a power source.

15. The wall light shelf according to claim 14, wherein said power source is a light socket or outlet.

* * * * *